(12) United States Patent
McKeon (10) Patent No.: US 10,280,637 B2
(45) Date of Patent: May 7, 2019

(54) LOAD CARRYING PLATFORM SHUTTLE

(71) Applicant: Gumboots Nominees Pty Limited, Alexandria, NSW (AU)

(72) Inventor: Allan Sydney McKeon, Alexandria (AU)

(73) Assignee: Gumboots Moninee Pty Limited, Alexandria, NSW (AU)

( * ) Notice: Subject to any disclaimer, the term of this patent is extended or adjusted under 35 U.S.C. 154(b) by 260 days.

(21) Appl. No.: 15/111,738

(22) PCT Filed: Jan. 9, 2015

(86) PCT No.: PCT/AU2015/000013
§ 371 (c)(1),
(2) Date: Jul. 14, 2016

(87) PCT Pub. No.: WO2015/106307
PCT Pub. Date: Jul. 23, 2015

(65) Prior Publication Data
US 2016/0348382 A1 Dec. 1, 2016

(30) Foreign Application Priority Data

Jan. 16, 2014 (AU) ................................ 2014900137

(51) Int. Cl.
*E04G 21/16* (2006.01)
*B65G 69/22* (2006.01)
*E04G 3/28* (2006.01)

(52) U.S. Cl.
CPC .......... *E04G 21/166* (2013.01); *B65G 69/22* (2013.01); *E04G 3/28* (2013.01); *E04G 2003/283* (2013.01)

(58) Field of Classification Search
CPC ... E04G 21/166; E04G 3/28; E04G 2003/283; A61G 3/061; A61G 3/067; B60P 1/431;
(Continued)

(56) References Cited

U.S. PATENT DOCUMENTS 2,739,325 A * 3/1956 Grace, Jr. .......... B65G 69/2811
14/69.5
5,636,399 A * 6/1997 Tremblay ............... A61G 3/061
14/71.1
(Continued)

FOREIGN PATENT DOCUMENTS

AU 680683 8/1997
CN 2649696 10/2004
(Continued)

*Primary Examiner* — Glenn F Myers
(74) *Attorney, Agent, or Firm* — Procopio Cory Hargreaves and Savitch LLP (57) ABSTRACT

The load carrying platform shuttle has a static frame that defines a cam surface. A carriage is arranged to telescope into the static frame. A ramp has an outboard edge rotatably connected to the carriage. A cam follower is disposed on the ramp so as to engage with the cam surface. The cam surface and the cam follower cooperate such that an inboard edge of the ramp is automatically maintained at an elevated height whilst the carriage is disposed intermediate of an extended position and a retracted position and such that the inboard edge of the ramp is automatically maintained at a lowered height whilst the carriage is at the retracted position. The static frame is constructed from I-beams that are reinforced to increase their resistance to the bending moment applied by the carriage whilst it is in the extended position.

15 Claims, 7 Drawing Sheets

(58) Field of Classification Search
CPC . B60P 3/41; B65F 9/00; B30B 9/3042; B65G 65/40; B65G 67/20; B65G 69/22; B65G 65/02; E21F 13/025; E21F 13/08
See application file for complete search history.

(56) References Cited

U.S. PATENT DOCUMENTS

| | | | | |
|---|---|---|---|---|
| 5,832,555 A | * | 11/1998 | Saucier | A61G 3/061 |
| | | | | 14/71.1 |
| 5,845,356 A | * | 12/1998 | Kielinski | B65G 69/30 |
| | | | | 14/69.5 |
| 2003/0029825 A1 | * | 2/2003 | Baxter, Sr. | B66C 23/201 |
| | | | | 212/179 |
| 2009/0020362 A1 | * | 1/2009 | Diaz | E04G 21/166 |
| | | | | 182/113 |

FOREIGN PATENT DOCUMENTS

| | | |
|---|---|---|
| GB | 2411390 | 2/2006 |
| JP | 2009209535 | 9/2009 |
| WO | 2005012672 A1 | 2/2005 |

\* cited by examiner

LOAD CARRYING PLATFORM SHUTTLE

CROSS REFERENCE TO RELATED APPLICATIONS

This application is a United States National Phase Application of PCT/AU2015/000013 filed Jan. 9, 2015, and claims priority to Australia Patent Application No. 2014900137 filed Jan. 16, 2014, both of which are incorporated by reference herein.

FIELD OF THE INVENTION

The present invention relates to a platform shuttle for use in a variety of commercial load carrying applications, such as in the construction of multi-storey buildings, in the warehousing industry and in the transport industry, where temporary or permanent use is required. The present invention also relates to a load carrying platform shuttle that embodies certain improvements over movable work platforms of the prior art.

BACKGROUND

Movable work platforms (also known as loading platforms, transportation platforms or construction platforms) are commonly used in multi-storey construction sites for the loading and unloading of building and other materials to and from a given working level of the building under construction. Such work platforms are secured within the building and can move between a retracted configuration and an extended configuration. In the extended configuration, the platform protrudes from the building and acts as a loading deck for crane loads to be loaded onto, and unloaded from, the platform.

It has been appreciated by the inventor of the current application that it would be advantageous to develop features that may be incorporated within mobile work platforms that serve to streamline operations, improve the safety of operation and/or that improve load-carrying capacity.

It is an object of the present invention to overcome, or at least substantially ameliorate, shortcomings of the prior art, or at least provide a useful alternative.

SUMMARY OF THE INVENTION

According to a first aspect of the present invention there is provided a load carrying platform shuttle comprising: a static frame securable to a mounting location, the static frame defining a cam surface; a carriage arranged to telescope into the static frame between an extended position wherein at least a majority of the carriage is outboard of the mounting location and a retracted position wherein at least a majority of the carriage is inboard of the mounting location; a ramp having an outboard edge rotatably connected to the carriage; and a cam follower disposed on the ramp so as to engage with the cam surface; wherein the cam surface and the cam follower cooperate such that an inboard edge of the ramp is automatically maintained at an elevated height whilst the carriage is disposed intermediate of the extended position and the retracted position; and wherein the cam surface and the cam follower cooperate such that the inboard edge of the ramp is automatically maintained at a lowered height whilst the carriage is at the retracted position.

Preferably the cam surface and cam follower cooperate such that the inboard edge of the ramp is automatically maintained at the lowered height whilst the carriage is at the extended position.

In one embodiment the cam surface extends between an outboard end that is proximate the cam follower when the carriage is disposed in the extended position and an inboard end that is proximate the cam follower when the carriage is disposed in the retracted position. In this embodiment the cam surface defines a first ramped portion at the outboard end and a second ramped portion at the inboard end and the first and second ramped portions are connected by an intermediate elongate straight portion.

Preferably the mounting location is a planar surface and the lowered height is such that the inboard edge of the ramp abuts the planar surface. Preferably the elevated height is such that a clearance gap is maintained between the inboard edge of the ramp and the planar surface.

In one embodiment the cam follower includes a roller positioned so as to rollingly engage the cam surface.

According to a second aspect of the present invention there is provided a method of using a load carrying platform shuttle as described above, the method including the steps of: loading a load onto the carriage whilst the carriage is positioned in the extended position; displacing the carriage towards the retracted position such that the cam and cam follower cooperate to automatically maintain the distal end of the ramp at the elevated height; and unloading the load from the carriage whilst the carriage is positioned in the retracted position such that the cam and cam follower cooperate to automatically maintain the distal end of the ramp at the lowered height.

According to a third aspect of the present invention there is provided a load carrying platform shuttle comprising: a static frame securable to a mounting location, the static frame defining a beam; and a carriage having a roller arranged to roll along said beam during displacement of the carriage between an extended position wherein at least a majority of the carriage is outboard of the mounting location and a retracted position wherein at least a majority of the carriage is inboard of the mounting location; wherein reinforcing is disposed on the beam so as to increase the resistance of the beam to a bending moment applied by the carriage to the beam whilst the carriage is in the extended position.

In one embodiment the reinforcing includes a plate disposed on an upper surface of the beam. Preferably the plate is welded to the upper surface.

In one embodiment the beam is an I-beam having upper and lower flanges and a web portion extending intermediate the upper and lower flanges. In this embodiment the I-beam includes a plurality of gussets spaced along the I-beam such that each gusset is perpendicular to, and extends along, the web portion between the upper and lower flanges and wherein the reinforcing includes at least one plate disposed generally parallel to, and spaced apart from, the web portion so as to extend between two adjacent gussets. In this embodiment the plate, flange and web portion together define a U-shaped channel.

In one embodiment the reinforcing is disposed on between 10% and 60% of the length of the beam. In another embodiment the reinforcing is disposed on a length of the beam that is between 500 mm and 3500 mm.

For the embodiment in which the beam is I-shaped, the roller may be disposed proximate to an inboard end of the carriage and the roller may bear against the upper flange of the I-beam and the reinforcing is disposed on the I-beam in the region in which the roller engages the upper flange of the I-beam when the carriage is in the extended position.

Preferably the reinforcing plate has a thickness of between 5 mm and 15 mm.

In a preferred embodiment a strengthening formation defining a lower surface is disposed along a bottom of the carriage and an outboard end of the beam includes a roller positioned to rollingly support substantially the full width of the underside of the strengthening formation.

SUMMARY OF THE DRAWINGS

Various embodiments of the invention will now be described by way of example only, with reference to the accompanying drawings, in which.

DETAILED DESCRIPTION

In the embodiments described below, like reference numerals refer to like features or components. Also, in some instances where there is a plurality of similar features or components positioned symmetrically, only some of the features or components may be labelled in the drawing figures. The embodiments are described in the context of the construction of multi-storey buildings, but the present invention is equally applicable to the transport industry or to the warehousing industry where heavy loads need to be moved into and out of a building.

Embodiments of the present invention are for use with a load carrying platform shuttle as disclosed in the Applicant's co-pending PCT International Application No. PCT/AU2013/000749, the contents of which are hereby incorporated in their entirety by way of reference.

With reference to the illustrated embodiment, the load carrying platform shuttle 10 is shown in an extended configuration in which at least a majority of the carriage is outboard of the mounting location. The load shuttle 10 has two main components: a static frame 12 and a movable carriage 14. The carriage 14 is nested within the frame 12 and can telescope to allow the shuttle 10 to move between the extended configuration and a retracted configuration in which at least a majority of the carriage is inboard of the mounting location.

In use of the load carrying platform shuttle 10 to carry loads in a multi-storey building, when the carriage 14 is in its extended position it protrudes out of the building in an outboard position such that a load can be placed on the carriage 14 by a crane. Moving the carriage 14 to its retracted position inboard of the building allows other crane movements to occur without interference from the protruding carriage 14. The embodiment shown is designed to carry a six tonne load between the extended and retracted positions. This substantial load carrying capacity is largely due to the strength of the bulk head 34 of the frame which houses the major load carrying components, and particularly the pair of "fully flanged" rollers 44 (or load bearing tyres). It is also due to the reinforcing that is applied to the frame, which is described in further detail below.

The load shuttle frame 12 is constructed from a pair of steel side I-beams 16 fixed together in parallel arrangement and mounted on a concrete slab or other mounting location. Each I-beam 16 has an upper flange 18 and a lower flange 20 interconnected by a vertical web portion 22, and this defines (for each I-beam 16 of the frame 12) a pair of vertically spaced apart, outer facing flange portions and a pair of vertically spaced apart, inner facing flange portions.

The load shuttle carriage 14 is also constructed from a pair of steel side I-beams 24 fixed together in parallel arrangement. Each I-beam 24 has an upper flange 26 and a lower flange 28 interconnected by a vertical web portion 30, and this defines (for each I-beam 24 of the carriage 14) a pair of vertically spaced apart, outer facing flange portions and a pair of vertically spaced apart, inner facing flange portions.

When the shuttle 10 is assembled, the outer facing flange portions of the side I-beams 24 of the carriage 14 nest within the inner facing flange portions of the side I-beams 16 of the frame 12. This limits the shuttle carriage 14 from tilting out of the shuttle frame 12.

In an alternative form, the I-beams 16, 24 may be replaced by parallel flange channels ("PFC's"), with the frame having a pair of steel side PFC's in which the channel faces inwardly, and with the carriage having a pair of steel side PFC's in which the channel faces outwardly and is nested within the inwardly facing channel of the frame. Other forms of beams may also be used, such as square channels and C-beams.

The side I-beams 16 of the load shuttle frame 12 are fixed with respect to each other by a set of frame cross braces 32. The frame cross braces 32 are set back from an outboard end of the frame 12 and limit the I-beams 16 of the frame 12 from moving apart.

At the outboard end of the frame 12 is a bulk head 34 (or frame nose portion) which includes a pair of opposed outer nose plates 36, an inner nose bracket plate 37 adjacent each outer nose plate 36, a motor and gearing assembly (not illustrated), a strengthening square section cross-beam 40 (or nose cross brace), a strengthening L-section cross-beam 41 (forming an "inverted L" when assembled), and an arrangement of support and guide rollers. The bulk head 34 houses these major load carrying components.

Attached to each nose plate 36 is an upper, frame mounted, carriage support roller 42 and a lower, frame mounted, carriage support roller 44 (or load bearing tyre), both support rollers 42, 44 being able to rotate about their horizontal axes. The lower support roller 44 is also attached, via its wide diameter rotating axle 45 and bearings, to the inner nose bracket plate 37. The upper support roller 42 and the lower support roller 44, in use, act as pinch rollers holding there between the outer facing flange portion of the lower flange 28 of the carriage side I-beams 24. The lower support roller 44 is wider than the upper support roller 42 and supports substantially the full width of the underside of the lower flange of each of the carriage side I-beams 24 (i.e. the roller 44 is "fully flanged"), thereby allowing the load to be distributed across a wider surface area such that the pair of "fully flanged" rollers 44 are able to carry or bear most of the load in the carriage 14. This load is significantly increased when the carriage 14 is in the extended position, and particularly when a substantial crane load has been received thereon. The use of such a lower, frame mounted, carriage support roller 44 in the telescoping movement of the carriage 14 into and out of the frame contributes significantly to allowing the shuttle 10 to carry a substantial crane load between the outboard and inboard positions at a given working level of a multi-storey building. The square section cross-beam 40 and the L-section cross-beam 41 brace the lower support roller 44 to further increase its load carrying capacity. Also, the upper and lower, frame mounted, carriage support rollers 42 and 44 contribute to limiting the vertical movement of the carriage 14 at the outboard end of the frame 12 by virtue of their pinching action on the lower flange 28 of the carriage side I-beam 24. This limits the outboard end of the carriage 14, when in its extended position, from deflecting or tilting dangerously before, and especially after, it has received a substantial crane load.

Also attached to each nose plate 36 is a frame mounted, carriage guide roller (not shown in the illustrations) able to rotate about its vertical axis. The pair of opposing guide rollers on the respective opposing nose plates 36 press firmly against and hold the outer facing sides of vertical web portions 30 of the carriage side I-beams 24. The opposing frame mounted, carriage guide rollers contribute to limiting the horizontal movement of the carriage 14 at the outboard end of the frame 12.

The bending moment that is applied by the carriage 14 to the I-beams 16 of the frame 12 is typically greatest when the carriage 14 is at the extended position because in this position a majority of the weight of the carriage 14 is outboard of the mounting location. This bending moment is primarily due to the downward force exerted by the carriage 14 on the lower frame mounted carriage support rollers 44 coupled with the upward force that is exerted by the upper carriage mounted carriage support rollers 58 on the inner facing portions of the upper flanges 18 of the frame's I-beams 16.

Figure 1A:
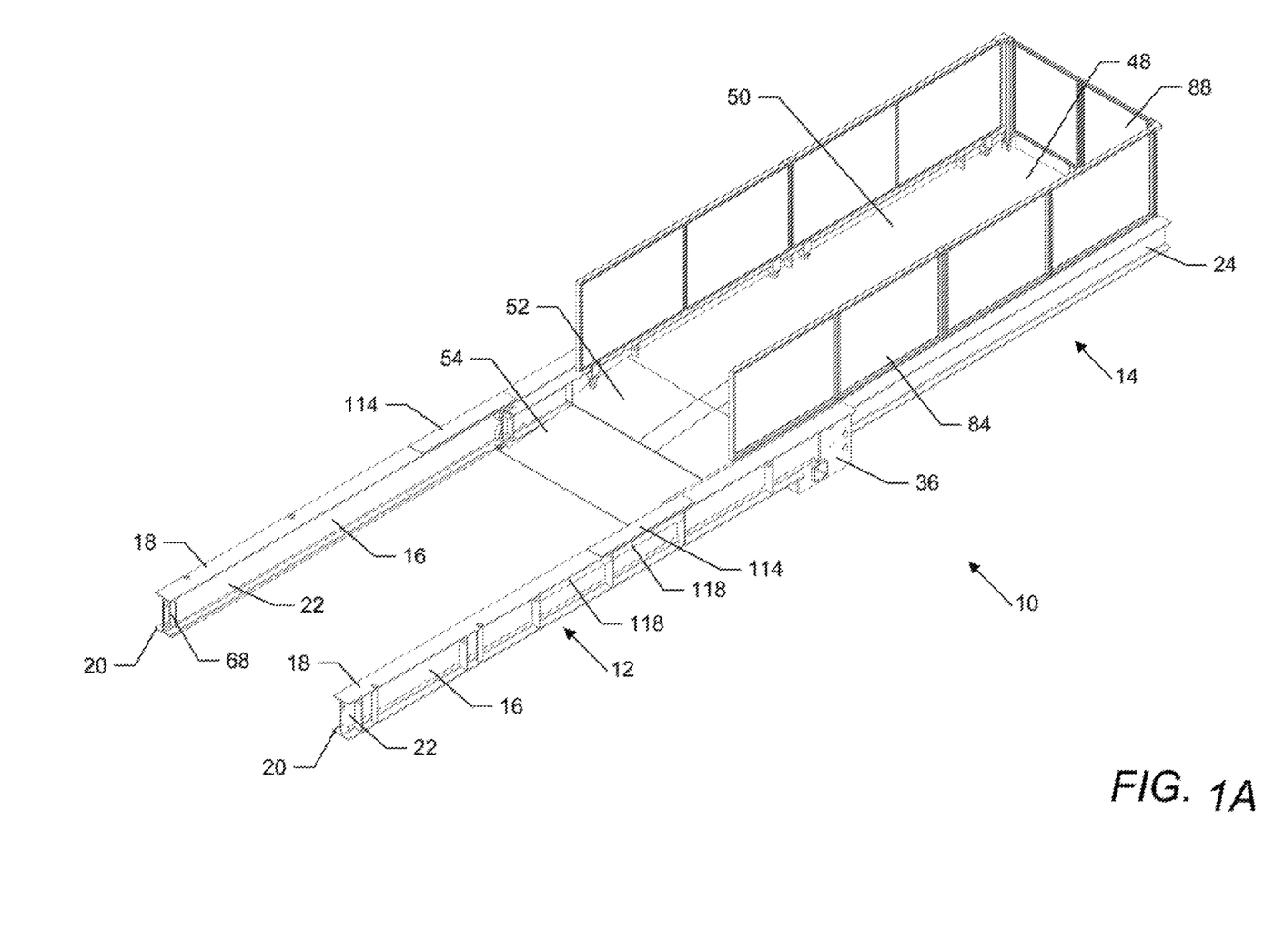
FIG. 1A is an upper perspective view of a load carrying platform shuttle according to a preferred embodiment of the invention, with the movable carriage of the shuttle being in the extended position.
Figure 1B:
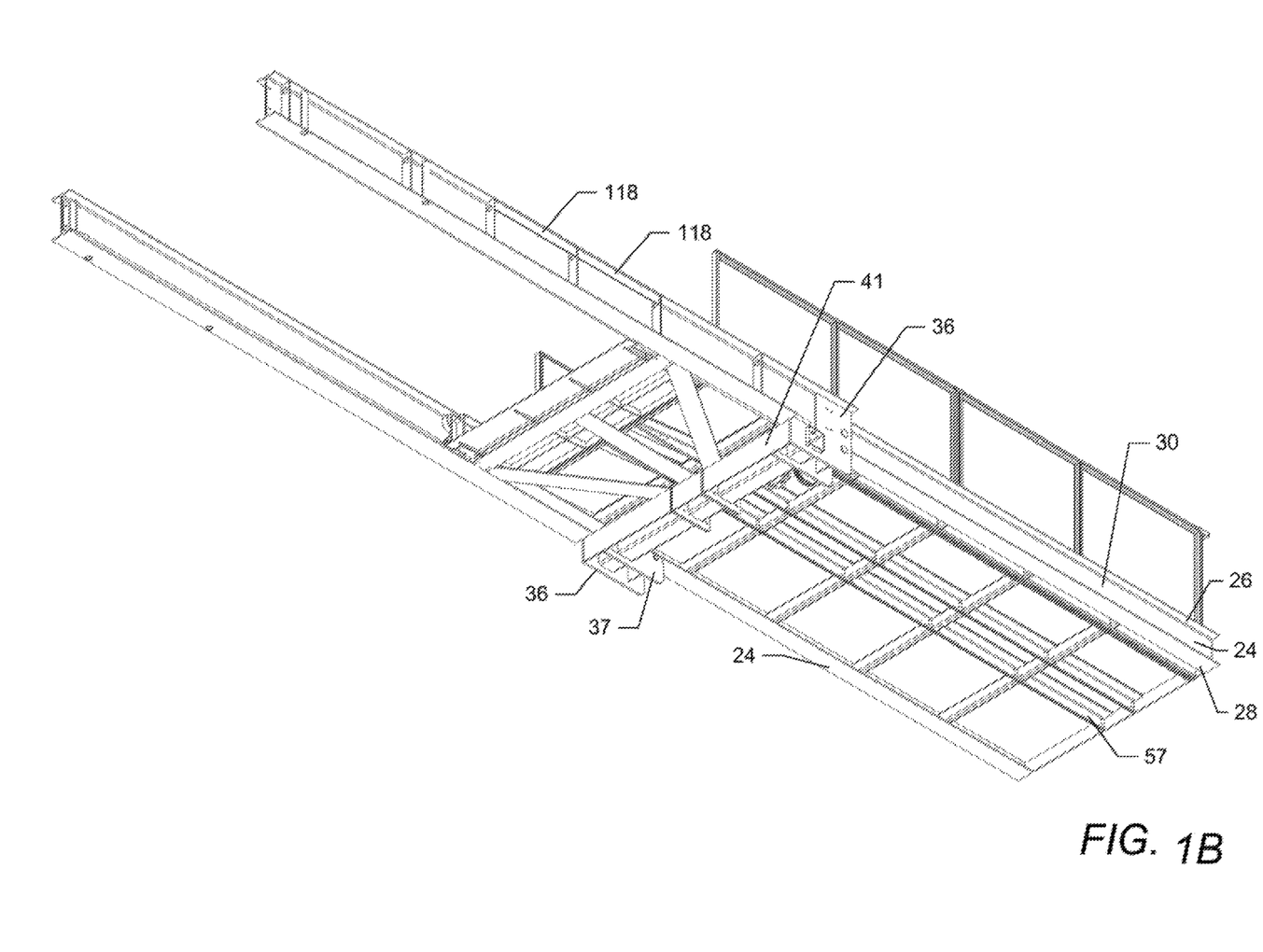
FIG. 1B is a lower perspective view of the shuttle.
Figure 1C:
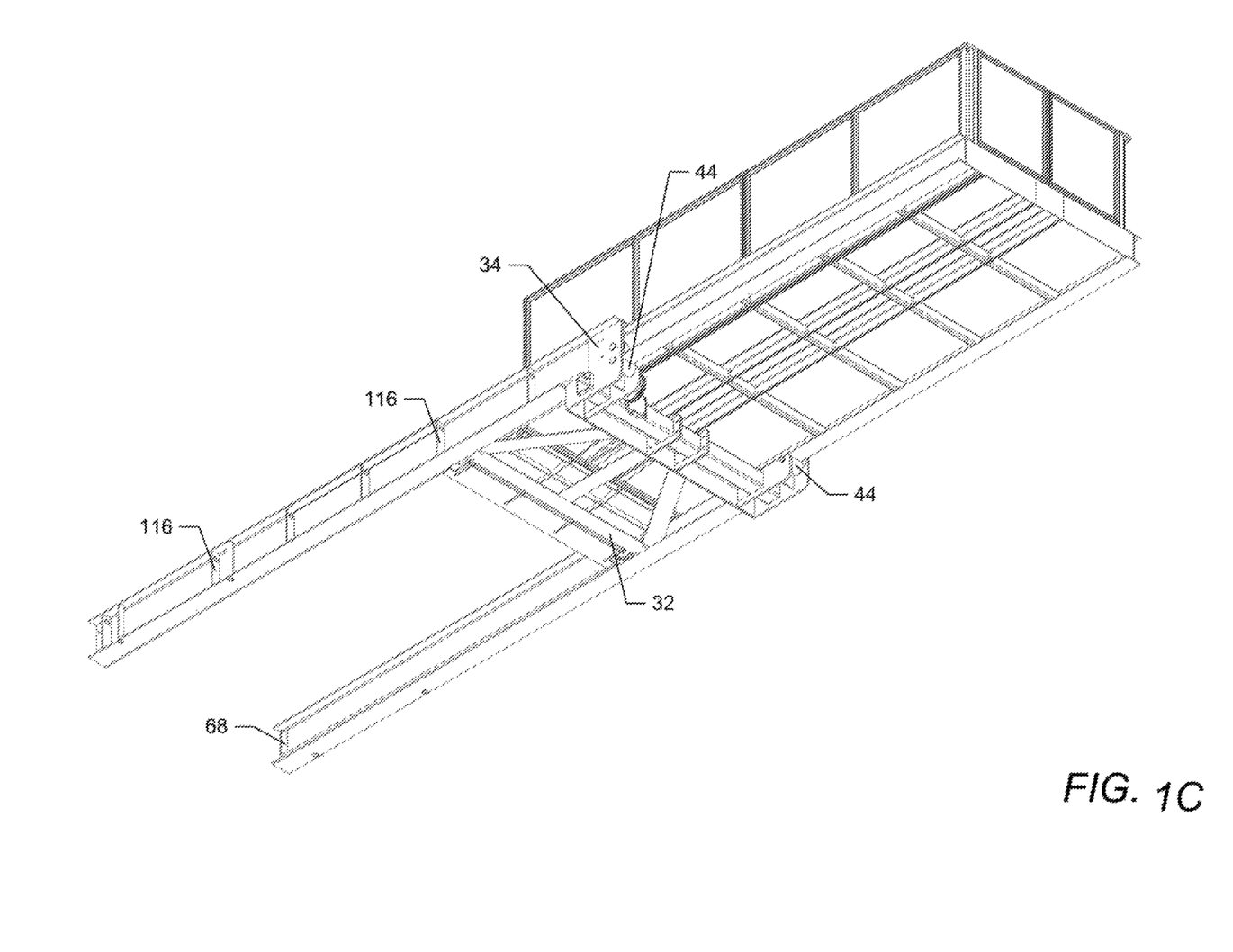
FIG. 1C is another lower perspective view of the shuttle.
Figure 2:
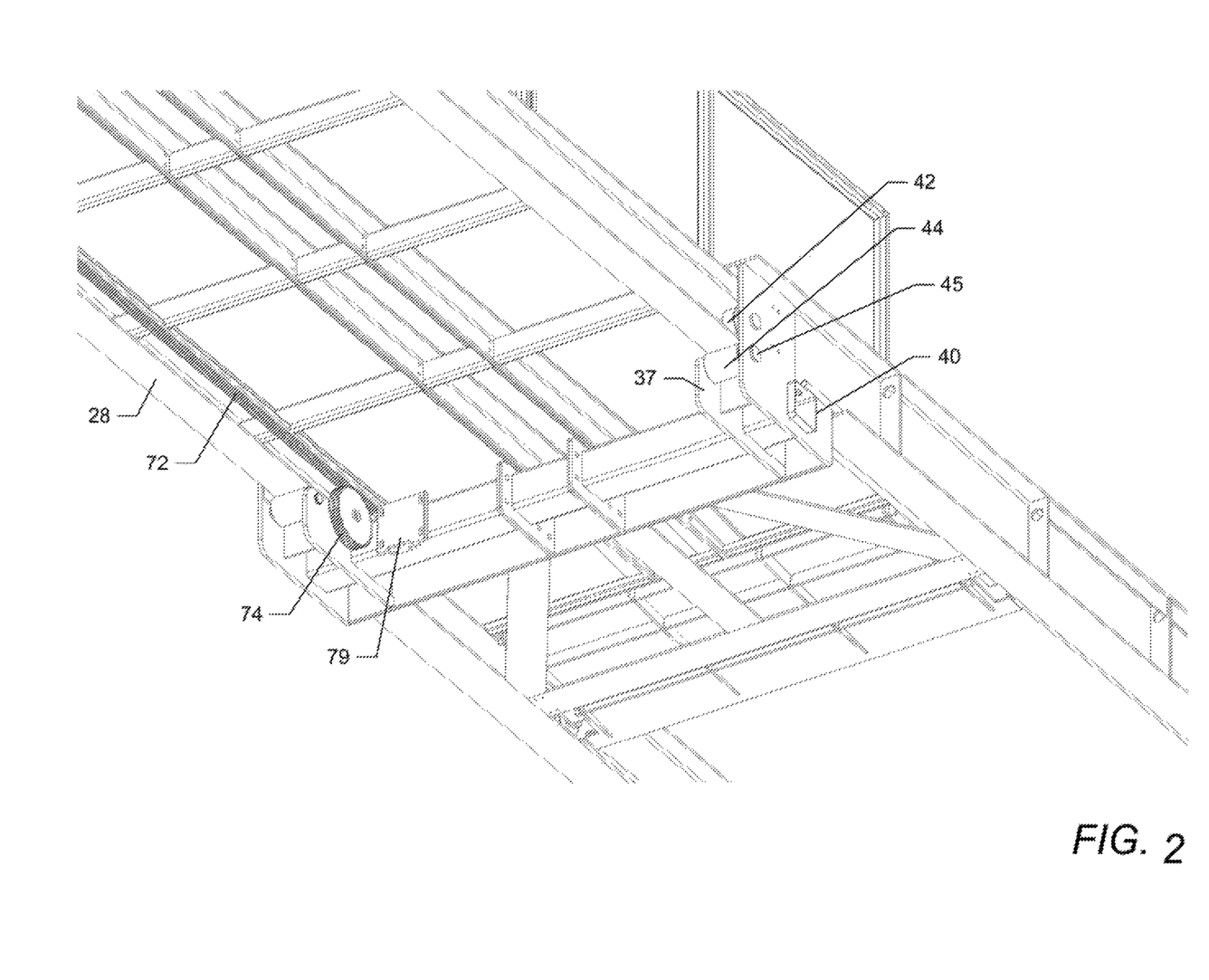
FIG. 2 is a lower perspective view of a portion of the shuttle.
Figure 3:
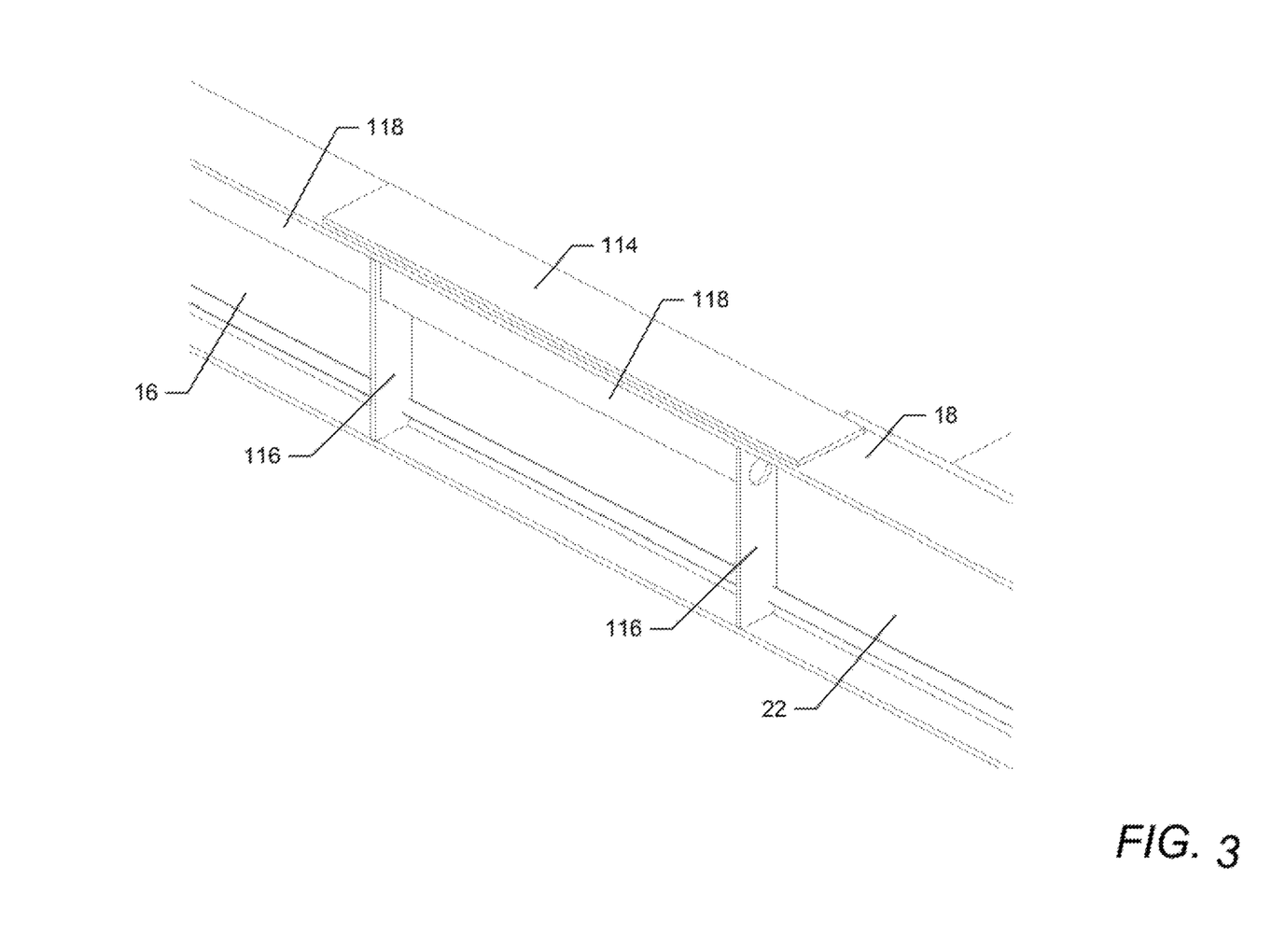
FIG. 3 is an upper perspective view of portions of the side I-beams that constitute part of the static frame of the shuttle.
Figure 4A:
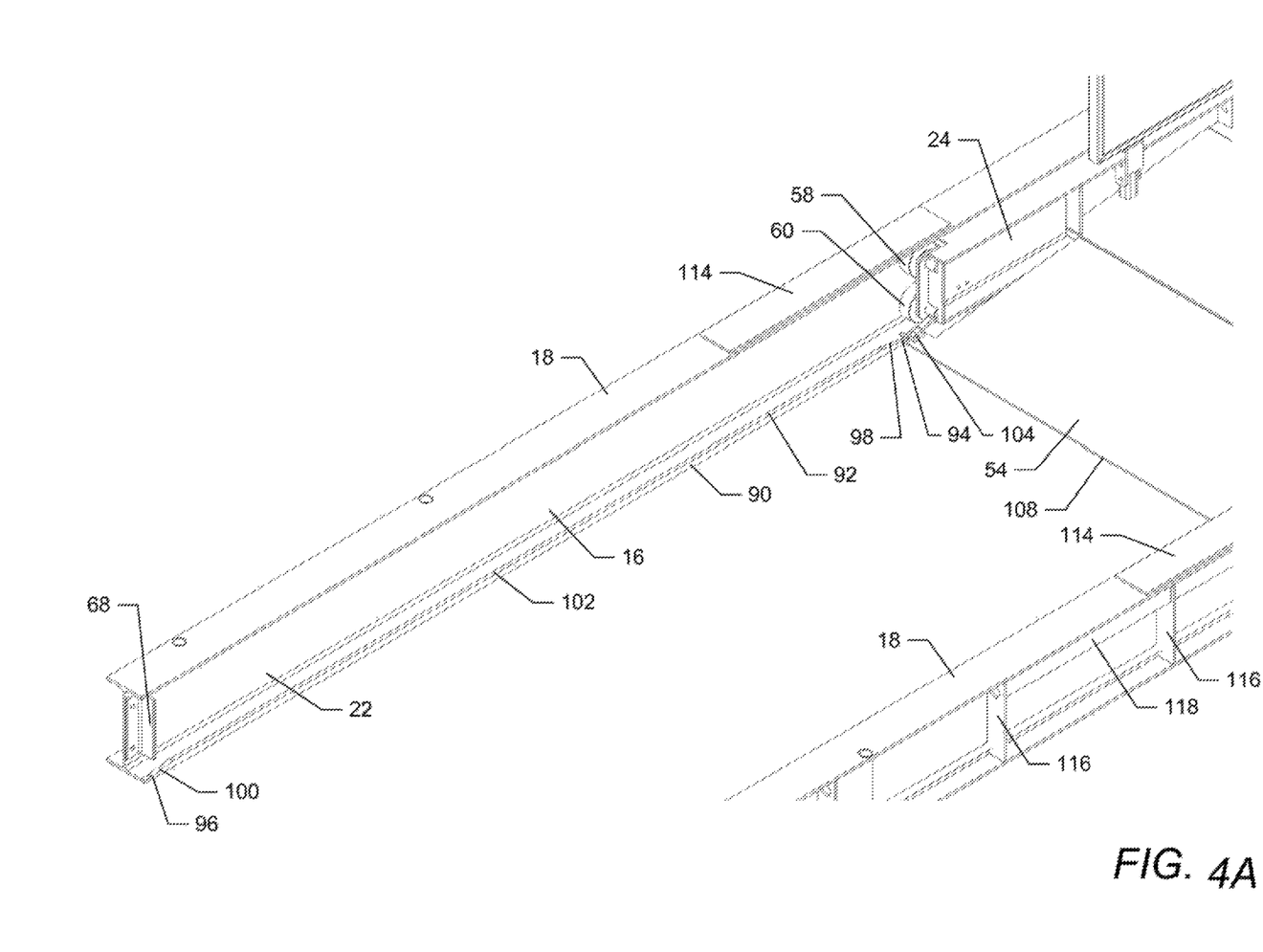
FIG. 4A is an upper perspective view of a portion of a side I-beam that constitutes part of the static frame of the shuttle, with a portion of the moveable carriage being depicted in the extended position.
Figure 4B:
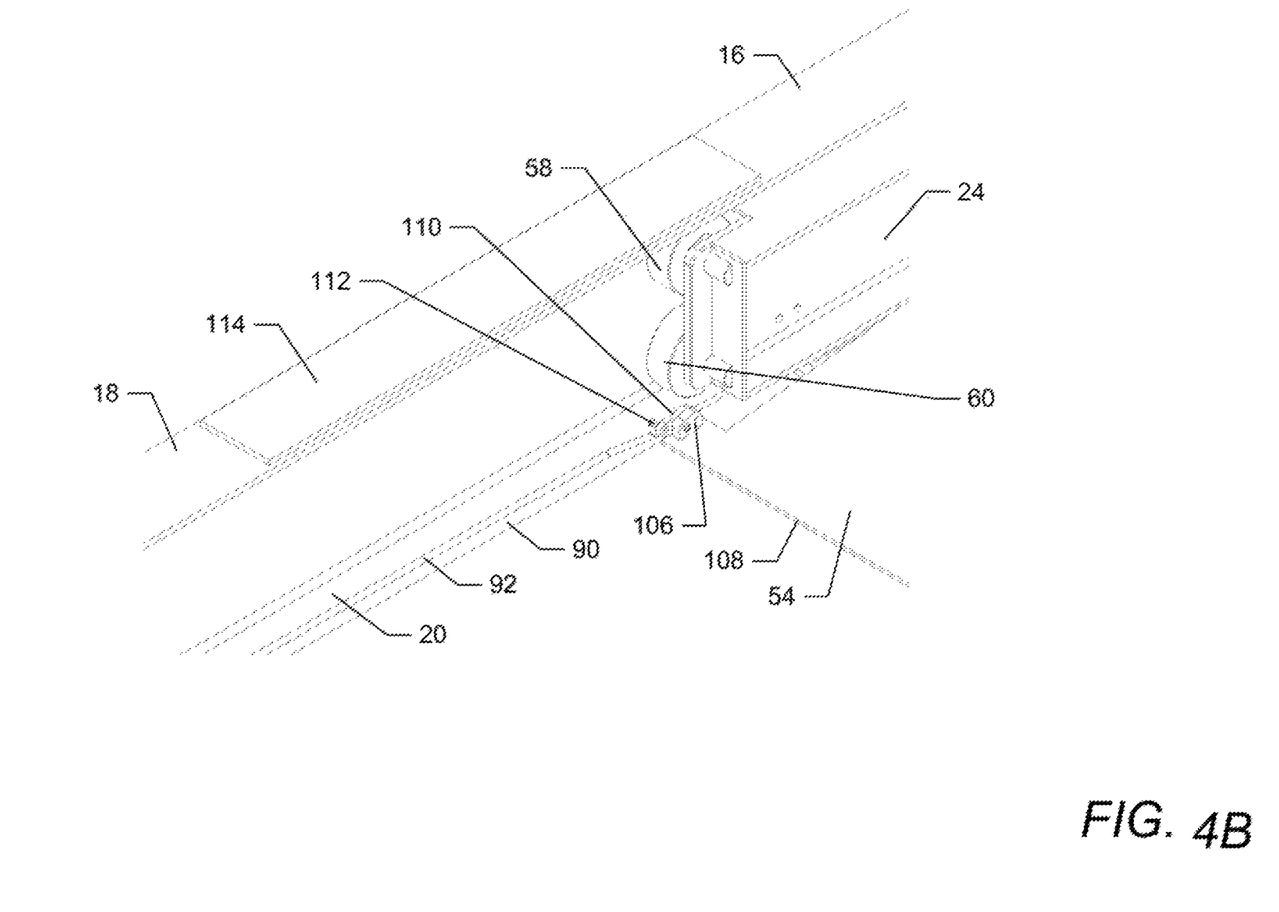
FIG. 4B is another upper perspective view of the portion of the side I-beam and a portion of the moveable carriage.

As best shown in FIGS. 3, 4A and 4B, the frames' I-beams 16 are reinforced to increase their resistance to the bending moment applied by the carriage 14 whilst it is in the extended position. The reinforcing is preferably disposed on between 10% and 60% of the length of each of the I-beams 16 and in the preferred embodiment it is disposed on approximately 30% of the length of each of the I-beams 16. In the preferred embodiment, each of the I-beams has a total length of 5870 mm. The reinforcing includes a pair of metal plates 114, each having a length of 1100 mm, which are respectively welded onto each of the upper flanges 18 of each I-beam 16. Each of the plates 114 preferably has a thickness of between 5 mm and 15 mm and in the preferred embodiment each plate 114 has a thickness of 10 mm.

Each of the frames' I-beams 16 has a plurality of gussets 116 spaced regularly along it. Each gusset 116 is perpendicular to, and extends along, the web portion 22 between the upper flange 18 and the lower flange 20. The reinforcing includes a pair of 8 mm thick plates 118 disposed generally parallel to, and spaced apart from, the web portion 22. Each of the plates 118 extends between two adjacent gussets 116. Each of the plates 118 is recessed by approximately 10 mm from the outer facing edge of the gussets 116, which assists with the welding of the plates 118 to the gussets 116. Together a plate 118, the upper flange 18 to which it is welded and the web portion 22 define a U-shaped channel, which further strengthens the I-beam 16 against bending.

Preferably the reinforcing is disposed on a length of each I-beam 16 that is between 500 mm and 3500 mm. In the preferred embodiment the two plates 118 together span a length of approximately 1650 mm.

The plates 114 and 118 are disposed in the region of the I-beam 18 at which the upward force is exerted by the upper carriage mounted carriage support roller 58 on the inner facing portion of the upper flange 18 of the I-beam 16 when the carriage 14 is in the extended position.

The carriage 14 has a carriage floor plate 48 (or carriage floor area) having a horizontal load receiving area 50 which transitions to a sloping ramp area 52 at an inboard end of the carriage 14. A ramp 54 is rotatably connected by hinges to an edge of the sloping ramp area 52. The sloping ramp area 52 and ramp 54 make it easier to roll or slide loads on and off the horizontal load receiving area 50 of the carriage floor plate 48. There is a load distributing and reinforcing frame structure 57 on the underside of the carriage floor plate 48.

As best shown in FIGS. 4A and 4B, a cam 90 is disposed on the static frame 12. An upper surface 92 of the cam 90 defines a profile that extends between an outboard end 94 and an inboard end 96. A first ramped portion 98 is at the outboard end 94, which tapers downwardly in the outboard direction. A second ramped portion 100 is at the inboard end 96, which tapers downwardly in the inboard direction.

The first and second ramped portions 98 and 100 are connected by an intermediate elongate straight portion 102.

A cam follower 104 is disposed on the ramp 54 so as to engage with the cam surface 92. The cam follower has a mounting block 106 that is bolted to the side of the ramp 54 adjacent the inboard edge 108 of the ramp 54. An arm 110 is rigidly attached at its outboard end to the mounting block 106 and a roller 112 is rotatably attached to the inboard end of the arm 110. This arrangement allows the roller 112 to be easily removed in the event that the roller 112 requires servicing or replacing.

As best shown in FIGS. 4A and 4B, the outboard end 94 of the cam surface 92 is proximate the cam follower 104 when the carriage 14 is disposed in the extended position. The inboard end 96 of the cam surface 92 is proximate the cam follower 104 when the carriage 14 is disposed in the retracted position. More particularly, the cam surface 92 conforms to the path taken by the roller 112 when the carriage is displaced between the extended and retracted positions. This allows the roller 112 to rollingly engage the cam surface 92 during movement of the carriage 14.

When the carriage 14 is disposed intermediate of the extended position and the retracted position the roller 112 of the cam follower 104 is positioned on the intermediate elongate straight portion 102. This maintains the cam follower 104 at an elevated height and, because the cam follower is rigidly mounted to the ramp 54, it also automatically maintains the inboard edge 108 of the ramp 54 at an elevated height.

In a typical implementation of the preferred embodiment, the mounting location of the frame 12 would be on a planar surface, such as cement slab flooring, for example. When the inboard edge 108 of the ramp 54 is being maintained at the elevated height, a clearance gap is maintained between the inboard edge 108 of the ramp 54 and the flooring. This allows the carriage 14 to be displaced between the inboard position and the outboard position without scraping the inboard edge 108 of the ramp 54 along the flooring.

When the carriage 14 is at the retracted position the cam surface 92 and the cam follower 104 cooperate such that the inboard edge 108 of the ramp 54 is automatically maintained at a lowered height. More particularly, when the carriage 14 is at the retracted position, the roller 112 of the cam follower 104 has descended the second ramped portion 100 that is at the inboard end 96 of the cam surface 92. This maintains the roller 112 at the lowered height. This, in turn, maintains the inboard edge 108 of the ramp 54 at a lowered height, which is selected such that the inboard edge 108 of the ramp 54 abuts the planar flooring surface. Hence, when the carriage is at the retracted position, the inboard edge 108 of the ramp 54 is automatically lowered to ease in the unloading of materials from the load receiving area 50 of the carriage 14.

Similarly, when the carriage 14 is at the extended position, as shown in the figures, the roller 112 of the cam follower 104 has descended the first ramped portion 98 that is at the outboard end 94 of the cam surface 92. This maintains the roller 112 at the lowered height, which, in turn, maintains the inboard edge 108 of the ramp 54 at a lowered height. This allows the inboard edge 108 of the ramp 54 to abut the planar flooring surface. Hence, when the carriage is at the extended position, the inboard edge 108 of the ramp 54 is automatically lowered to ease in the loading of materials onto the load receiving area 50 of the carriage 14.

A method of using a load carrying platform shuttle 10 commences with the use of a crane to place a load onto the load receiving area 50 of the carriage 14. This is done whilst the carriage 14 is positioned in the extended position. Once loaded, the carriage 14 is displaced towards the retracted position. As will be apparent from the above description, whilst the carriage 14 is in an intermediate position between the extended and retracted positions the cam 90 and cam follower 104 cooperate to automatically maintain the inboard edge 108 of the ramp 54 at the elevated height to avoid scraping of the ramp 54 on the flooring surface whilst the carriage 14 is moving. Once the carriage 14 reaches the retracted position the cam 90 and cam follower 104 cooperate to automatically maintain the inboard edge 108 of the ramp 54 at the lowered height. This abuts the inboard edge 108 of the ramp 54 against the flooring surface to ease unloading of the load from the load receiving area 50 of the carriage 14.

Alternative embodiments of the invention make use of differing cam profiles. For example, if it is necessary to ensure that the inboard edge 108 of the ramp 54 is higher at any point in the travel of the carriage 14 to provide additional clearance, then a curved cam surface may take the place of the elongate straight portion 102, with the curved surface being higher at the points in the carriage travel when additional clearance is required. In yet other embodiments the slope of the ramped portions 98 and 100 may be steeper, or shallower, in order to raise the inboard edge 108 of the ramp 54 either faster or slower, as required, relative to the speed of carriage travel. In some implementations a faster rate of rising of the inboard edge 108 at the commencement of the carriage travel from either the extended or the retracted positions may assist to avoid mechanical damage of the various components.

The carriage 14 has an upper, carriage mounted, carriage support roller 58 and a lower, carriage mounted, carriage support roller 60 attached at the inboard end of each of the carriage side I-beams 24, both support rollers 58, 60 being able to rotate about their horizontal axes. The upper support roller 58 engages with the lower side of the inner facing portion of the upper flange 18 of the frame side I-beam 16 and the lower support roller 60 engages with the upper side of the inner facing portion of the lower flange 20 of the frame I-side beam 16. The opposing pairs of upper and lower, carriage mounted, carriage support rollers 58, 60 contribute to limiting the vertical movement of the carriage 14 at the inboard end of the frame 12.

Also attached at the inboard end of each of the carriage side I-beams 24 is a carriage mounted, carriage guide roller (not shown in the figures), the guide roller being able to rotate about its vertical axis. Each guide roller is attached to the outer facing surface of vertical web portion 30 of the carriage side I-beam 24. The opposing carriage guide rollers on the carriage side I-beams 24 engage with a respective inner facing side of vertical web portion 22 of the frame side I-beam 16, and this contributes to limiting the horizontal movement of the inboard end of the carriage.

The extent of movement between the extended configuration and the retracted configuration of the load carrying platform shuttle 10 is governed by travel stops. The frame 12 has a pair of frame mounted, carriage extension travel stops (not shown in the figures) and a frame mounted, carriage retraction travel stop 68 on each frame side I-beam 16. The carriage extension travel stops are attached to the upper and lower sides of the inner facing portions of the upper and lower flanges 18, 20 of each frame side I-beam 16. The travel stops are proximate to the outboard end of the frame 12 and adjacent to where the frame cross braces 32 interconnect the I-beams 16.

The carriage 14 has a pair of carriage mounted, carriage extension travel stops (not shown in the figures) on each carriage side I-beam 24. The carriage extension travel stops are attached to the lower and upper sides of the outer facing portions of the lower and upper flanges 28, 26 of each carriage side I-beam 24. The carriage extension travel stops are proximate to the inboard end of the carriage 14.

The extent of the carriage 14 moving telescopically to its extended position from the frame 12 is limited by the carriage mounted, carriage extension travel stops 70 abutting their corresponding frame mounted, carriage extension travel stops.

The extent of the carriage 14 moving telescopically to its retracted position to the frame 12 is limited by the inboard end of each carriage side I-beam 24 abutting a respective carriage retraction travel stop 68 (or rear bump stop) on each frame side I-beam 16.

The movement between the extended configuration and the retracted configuration of the shuttle 10 can be driven by means of a motor or a hand operated mechanism.

In the illustrated embodiment the movement is generated by a rack and pinion drive mechanism powered by an electrical motor and gearing assembly. Secured alongside the lower flange 28 of one of the carriage side I-beams 24 is a rack 72 which extends along the length of the underside of the horizontal load receiving area 50 of the floor plate 48. The rack 72 is engaged by meshing of teeth on a pinion 74 (or spur gear). The pinion 74 is rotated, thereby moving the rack 72 and the carriage 14, in either of two possible directions by operation of a motor (not illustrated) and its gear box (not illustrated). Connected to the cross-beam 40 is a motor adjustment block 79. The motor may be a DC or AC motor with, for example, a power rating of 600 Watts and gearing ratio of 100:1. In other embodiments, a gearing ratio of 120:1 is used. The drive mechanism may have different gearing depending on the means of operation. A hand operated drive mechanism, for example, would have a significantly different gearing to that of an electrical motor drive mechanism.

In use, and in the context of the construction of a multi-storey building, the load carrying platform shuttle 10 is positioned in a retracted configuration on the upper surface of a floor or concrete floor slab at a given working level of the building, with the bulk head 34 (or nose portion) of the frame 12 protruding away from the outboard edge of the slab and projecting below the upper surface of the slab.

The frame 12 is secured to the concrete floor slab in the building using conventional props which extend between the slab of a floor level above and frame stay mounts to brace the frame 12. Alternatively, the frame 12 is secured to the floor slab using concrete ties or other suitable anchors for the frame 12.

The shuttle 10 including the frame 12 and the carriage 14 can, when required, be lifted as a unit by a crane using four crane mounts on the frame 12.

The carriage 14 has eight guard rail brackets (not shown in the figures) attached to the carriage side I-beams 24 for supporting guard rails 84 that project perpendicularly in erect positions from the carriage floor plate 48. The guard rails 84 extend down the length of each carriage side I-beam 24 from the outboard facing end thereof to the inboard end of the horizontal load receiving area 50, and can be pivoted downwardly and inwardly to collapsed positions flat on the carriage floor plate 48.

The guard rails 84 down each side of the carriage 14 are a pair of steel panels that are interconnected on their top edge with a bracket which also functions as a harness attachment point. This harness attachment point provides a point to attach a safety harness that allows safe movement of a worker around the full area of the carriage floor plate 48. There is also a pair of harness attachment points on opposite sides of the carriage floor plate 48.

The outermost guard rails 84 support guard gates 88 that project perpendicularly in erect positions from the carriage floor plate 48 and extend across the outboard edge of the carriage floor plate 48, thus providing a closed position. The guard gates 88 can be pivoted between the closed position and an open position where they connect to the guard rails 84. The guard gates 88 guard against loads or workers accidentally falling from the carriage 14.

The shuttle 10 also includes a collision prevention sensor apparatus across the inboard end of the frame 12. The sensor apparatus utilizes a laser beam emitter and receiver to detect any interruption of the beam that is indicative of a person or other object entering a dangerous risk of collision zone at the inboard end of the frame 12 while the carriage 14 is being retracted to its inboard position. Interruption of the beam causes the motor 76 to immediately stop and the carriage 14 to become stationary, until the danger is removed, whereupon the operation of the shuttle can be resumed.

Operation of the shuttle 10 can involve a custom built, electrical control system located in a readily accessible housing connected to the shuttle. The power supply can be either DC or AC. The power supply can be provided by batteries or by AC of any voltage, but preferably low voltage.

The electrical control system may include: a fused circuit for over current, sensing devices to allow for slow zones, sensing devices to prevent override, emergency shutdown systems, independent circuit with emergency cut out and start up buttons, sensor to alert an increase in current if the carriage is inadvertently obstructed, button hold-down to permit movement and shutdown if button released, remote controller to move carriage, shuttle specific programmable remote controller, and LCD displays on the control and indicator panel. Among the information that can be provided on the control and indicator panel for any such electrical control system are: low battery alert, charging light, charged light, ready to start light, error lights which indicate over current, and PE trip light.

In the event of power failure or equipment failure, mechanical override systems can be provided to move the carriage.

It will be appreciated that an advantage of the load carrying platform shuttle of the present invention, when used in the construction of a multi-storey building, for example, is that the ramp 54 is automatically lifted and lowered as required.

Additionally, the reinforcing plates 114 and 118 advantageously increase the load carrying capacity of the shuttle 10.

Although the present invention has been described with reference to particular embodiments, it will be appreciated by those skilled in the art that the invention may be embodied in many other forms. For example, the drive mechanism could be a hydraulic piston arrangement.

The invention claimed is:

1. A load carrying platform shuttle comprising:
   a static frame securable to a mounting location, the static frame defining a cam surface;
   a carriage arranged to telescope into the static frame between an extended position wherein at least a majority of the carriage is outboard of the mounting location and a retracted position wherein at least a majority of the carriage is inboard of the mounting location;
   a ramp having an outboard edge rotatably connected to the carriage; and
   a cam follower disposed on the ramp so as to engage with the cam surface;
   wherein the cam surface and the cam follower cooperate such that an inboard edge of the ramp is automatically maintained at an elevated height whilst the carriage is disposed intermediate of the extended position and the retracted position;
   wherein the cam surface and the cam follower cooperate such that the inboard edge of the ramp is automatically maintained at a lowered height whilst the carriage is at the retracted position;
   wherein the cam surface and cam follower cooperate such that the inboard edge of the ramp is automatically maintained at the lowered height whilst the carriage is at the extended position;
   wherein the cam surface extends between an outboard end that is proximate the cam follower when the carriage is disposed in the extended position and an inboard end that is proximate the cam follower when the carriage is disposed in the retracted position; and
   wherein the cam surface defines a first ramped portion at the outboard end and a second ramped portion at the inboard end.

2. A load carrying platform shuttle according to claim 1 wherein the first and second ramped portions are connected by an intermediate elongate straight portion.

3. A load carrying platform shuttle according to claim 1 wherein the mounting location is a planar surface and wherein the lowered height is such that the inboard edge of the ramp abuts the planar surface.

4. A load carrying platform shuttle according to claim 3 wherein the elevated height is such that a clearance gap is maintained between the inboard edge of the ramp and the planar surface.

5. A load carrying platform shuttle according to claim 1 wherein the cam follower includes a roller positioned so as to rollingly engage the cam surface.

6. A method of using a load carrying platform shuttle, the method including the steps of:
   providing a load carrying platform shuttle comprising: a static frame securable to a mounting location, the static frame defining a cam surface; a carriage arranged to telescope into the static frame between an extended position wherein at least a majority of the carriage is outboard of the mounting location and a retracted position wherein at least a majority of the carriage is inboard of the mounting location; a ramp having an outboard edge rotatably connected to the carriage; and a cam follower disposed on the ramp so as to engage with the cam surface; wherein the cam surface and the cam follower cooperate such that an inboard edge of the ramp is automatically maintained at an elevated height whilst the carriage is disposed intermediate of the extended position and the retracted position; and wherein the cam surface and the cam follower cooperate such that the inboard edge of the ramp is automatically maintained at a lowered height whilst the carriage is at the retracted position;

loading a load onto the carriage whilst the carriage is positioned in the extended position;

displacing the carriage towards the retracted position such that the cam and cam follower cooperate to automatically maintain the inboard edge of the ramp at the elevated height; and unloading the load from the carriage whilst the carriage is positioned in the retracted position such that the cam and cam follower cooperate to automatically maintain the inboard edge of the ramp at the lowered height.

7. A load carrying platform shuttle comprising:

a static frame securable to a mounting location, the static frame defining a beam; and a carriage having a roller arranged to roll along said beam during displacement of the carriage between an extended position wherein at least a majority of the carriage is outboard of the mounting location and a retracted position wherein at least a majority of the carriage is inboard of the mounting location;

wherein reinforcing is disposed on the beam so as to increase the resistance of the beam to a bending moment applied by the carriage to the beam whilst the carriage is in the extended position;

wherein the beam is an I-beam having upper and lower flanges and a web portion extending intermediate the upper and lower flanges; and wherein the I-beam includes a plurality of gussets spaced along the I-beam such that each gusset is perpendicular to, and extends along, the web portion between the upper and lower flanges and wherein the reinforcing includes at least one plate disposed generally parallel to, and spaced apart from, the web portion so as to extend between two adjacent gussets.

8. A load carrying platform shuttle according to claim 7 wherein the reinforcing includes a plate disposed on an upper surface of the beam.

9. A load carrying platform shuttle according to claim 8 wherein the plate is welded to the upper surface.

10. A load carrying platform shuttle according to claim 8 wherein the plate has a thickness of between 5 mm and 15 mm.

11. A load carrying platform shuttle according to claim 7 wherein the plate, flange and web portion together define a U-shaped channel.

12. A load carrying platform shuttle according to claim 7 wherein the reinforcing is disposed on between 10% and 60% of the length of the beam.

13. A load carrying platform shuttle according to claim 7 wherein the reinforcing is disposed on a length of the beam that is between 500 mm and 3500 mm.

14. A load carrying platform shuttle according to claim 7 wherein the roller is disposed proximate to an inboard end of the carriage and wherein the roller bears against the upper flange of the I-beam and wherein the reinforcing is disposed on the I-beam in the region in which the roller engages the upper flange of the I-beam when the carriage is in the extended position.

15. A load carrying platform shuttle according to claim 7 wherein a strengthening formation defining a lower surface is disposed along a bottom of the carriage and wherein an outboard end of the beam includes a roller positioned to rollingly support substantially the full width of the underside of the strengthening formation.

* * * * *